United States Patent
Yim et al.

(10) Patent No.: US 7,392,323 B2
(45) Date of Patent: *Jun. 24, 2008

(54) METHOD AND APPARATUS FOR TUNNELING DATA USING A SINGLE SIMULATED STATEFUL TCP CONNECTION

(75) Inventors: Wai Yim, Mountain View, CA (US); Chia-Hsin Li, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 563 days.

This patent is subject to a terminal disclaimer.

(21) Appl. No.: 10/990,274

(22) Filed: Nov. 16, 2004

(65) Prior Publication Data

US 2006/0104288 A1 May 18, 2006

(51) Int. Cl.
*G06F 15/16* (2006.01)
*H04L 12/28* (2006.01)
(52) U.S. Cl. ............... 709/236; 709/223; 370/395.52
(58) Field of Classification Search ............... 709/230; 370/395.52
See application file for complete search history.

(56) References Cited

U.S. PATENT DOCUMENTS

| | | | |
|---|---|---|---|
| 5,958,053 A | 9/1999 | Denker | |
| 6,018,530 A | 1/2000 | Chakravorty | |
| 6,226,680 B1 | 5/2001 | Boucher et al. | |
| 6,310,892 B1 | 10/2001 | Olkin | |
| 6,338,131 B1 | 1/2002 | Dillon | |
| 6,360,265 B1 | 3/2002 | Falck et al. | |
| 6,424,626 B1 | 7/2002 | Kidambi et al. | |
| 6,438,105 B1 * | 8/2002 | Qarni et al. | 370/231 |
| 6,470,020 B1 | 10/2002 | Barker et al. | |
| 6,633,985 B2 | 10/2003 | Drell | |
| 6,976,205 B1 * | 12/2005 | Ziai et al. | 714/807 |
| 6,977,896 B1 * | 12/2005 | Kobayashi | 370/235 |
| 2001/0032270 A1 | 10/2001 | Koo | |
| 2001/0056492 A1 * | 12/2001 | Bressoud et al. | 709/227 |
| 2002/0010938 A1 | 1/2002 | Zhang et al. | |
| 2002/0042832 A1 | 4/2002 | Fallentine et al. | |

(Continued)

FOREIGN PATENT DOCUMENTS

JP 11-234270 8/1999

(Continued)

OTHER PUBLICATIONS

Danzeisen et al.; "Access of Mobile IP users to Firewall protected VPNs"; http://www.iam.unibe.ch/~rvs/publications/secmip_gi.pdf; Aug. 7, 2003.*

(Continued)

*Primary Examiner*—Jason Cardone
*Assistant Examiner*—Lin Liu

(57) ABSTRACT

Methods and systems for tunneling data associated with a packet based multimedia communication standard are provided. The method includes intercepting a library call associated with the multimedia communication standard in a modified TCP/IP stack and registering identification data associated with the library call. A modified Transmission Control Protocol/Internet Protocol (TCP/IP) header is appended over a pre-existing header of a data packet related to the identification data. The method also provides for transmitting the data packet having the TCP/IP header through a firewall. The TCP/IP header includes a TCP SEQ number and a TCP ACK number to provide a stateful connection.

26 Claims, 12 Drawing Sheets

U.S. PATENT DOCUMENTS

| | | |
|---|---|---|
| 2002/0085561 A1 | 7/2002 | Choi et al. |
| 2002/0091831 A1 | 7/2002 | Johnson |
| 2002/0124095 A1 | 9/2002 | Sultan |
| 2002/0133549 A1 | 9/2002 | Warrier et al. |
| 2002/0147826 A1 | 10/2002 | Sultan |
| 2002/0152325 A1 | 10/2002 | Elgebaly et al. |
| 2002/0156903 A1 | 10/2002 | Corneliussen |
| 2003/0009571 A1* | 1/2003 | Bavadekar ............... 709/230 |
| 2003/0048780 A1 | 3/2003 | Phomsopha |
| 2003/0079009 A1 | 4/2003 | Takaoka |
| 2003/0097447 A1 | 5/2003 | Johnston |
| 2003/0152068 A1 | 8/2003 | Balasaygun et al. |
| 2003/0154410 A1 | 8/2003 | Drell |
| 2003/0188001 A1 | 10/2003 | Eisenberg et al. |
| 2004/0029555 A1* | 2/2004 | Tsai et al. ............... 455/403 |
| 2006/0168321 A1* | 7/2006 | Eisenberg et al. ......... 709/238 |
| 2007/0118665 A1* | 5/2007 | Philbrick et al. .......... 709/230 |

FOREIGN PATENT DOCUMENTS

| | | |
|---|---|---|
| JP | 2000-099428 | 4/2000 |
| JP | 2000-172597 | 6/2000 |
| JP | 2001-77865 | 3/2001 |
| JP | 2002-132597 | 5/2002 |
| JP | 2002-359652 | 12/2002 |
| JP | 2004-064490 | 2/2004 |
| WO | WO 98/34384 | 8/1998 |
| WO | WO 02/071717 | 9/2002 |

OTHER PUBLICATIONS

Victor Paulsamy et al., "Network Convergence and the NAT/Firewall Problems", *Proceedings of the 36th Hawaii International Conference on System Sciences (HICSS '03)*, 2002 IEEE.

Bakre et al., "Implementation and Performance Evaluation of Indirect TCP", *IEEE Transactions on Computers*, vol. 46, No. 3, Mar. 1997, pp. 260-278.

Balakrishnan et al., "Improving TCP/IP Performance over Wireless Networks", *Proceedings of the First Annual International Conference on Mobile Computing and Networking*, 1995, pp. 2-11.

"Ridgeway Systems H.323 Firewall/NAT Problem Fix", oldwww.internet2.edu/commons/html/h232-firewall-nat.html, 2003.

B. Goode, "Voice Over Internet Protocol (VoIP), "*Proceedings of the IEEE*, vol. 90, No. 9, Sep. 2002, pp. 1495-1517.

"How to Establish NetMeeting Connections Through A Firewall" support.Microsoft.com, May 2000.

* cited by examiner

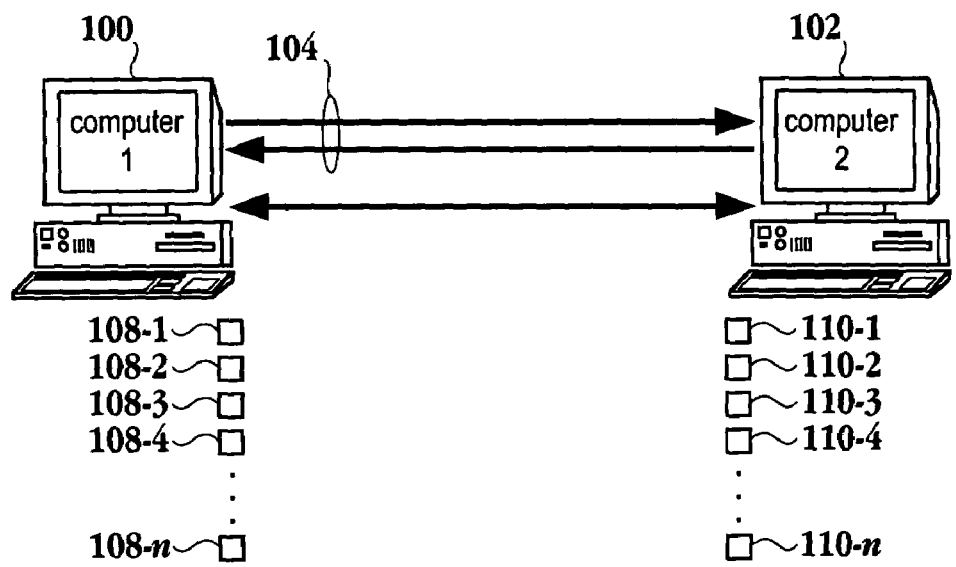
Fig. 1 *(prior art)*
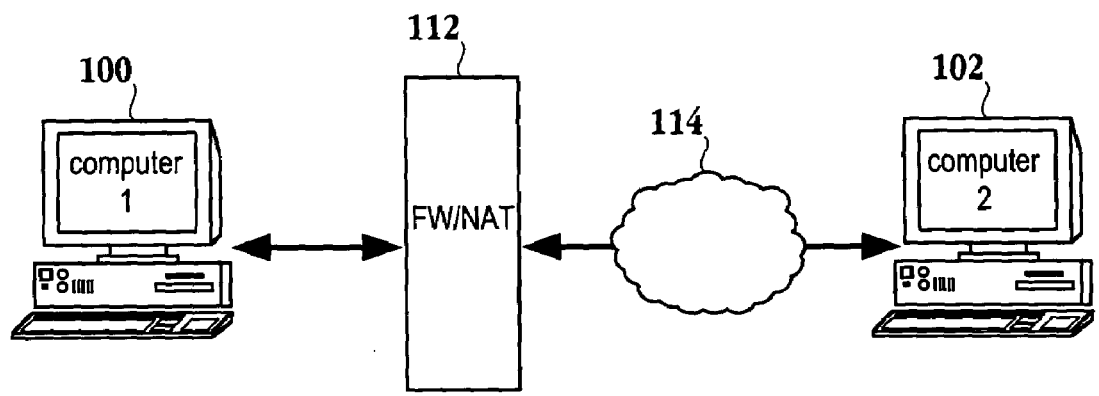
Fig. 2 *(prior art)*

METHOD AND APPARATUS FOR TUNNELING DATA USING A SINGLE SIMULATED STATEFUL TCP CONNECTION

CROSS REFERENCE TO RELATED APPLICATIONS

The present application is related to U.S. patent application Ser. No. 10/681,523, entitled "METHOD AND APPARATUS FOR TUNNELING DATA THROUGH A SINGLE PORT." The present application is also related to U.S. patent application Ser. No. 10/681,732, entitled "CONNECTIONLESS TCP/IP DATA EXCHANGE." Each of these related applications is hereby incorporated by reference in its entirety for all purposes.

BACKGROUND OF THE INVENTION

The present invention relates generally to the transmission of information across the Internet, and more specifically to methods, systems, and apparatus for rapid, real-time transmission of information across the Internet and within networks and networked systems.

Many Internet based applications require real-time transmission and exchange of data for effective implementation. By way of example, H.323 Internet video conferencing provides rapid, real time data exchange to present video and audio data for participants in local and remote settings. Typically, to realize the benefits of necessary real-time data exchange, data is transmitted over unreliable User Datagram Protocol/Internet Protocol (UDP/IP, or simply UDP). The advantage of using the unreliable UDP over the reliable Transmission Control Protocol (TCP, also TCP/IP) is primarily an advantage of speed. UDP has less overhead since it does not transmit packet acknowledgement, packet verification, packet re-transmission requests, etc. In real time media transmission and play-back, such transmissions and verification processes negatively impact the system performance.

TCP serves as essentially the standard for most Internet data transmission. TCP maintains the highest degree of reliability by ensuring all data is received, received in the correct order, and that the data received is accurate and consistent with the data that was transmitted. In many applications, such reliability is paramount for effective data transmission. The highest degree of reliability, however, is not necessary for applications such as H.323 Internet video conferencing, where speed is paramount. Most video-conferencing applications can easily compensate for occasionally missed audio data, which is generally imperceptible, and similarly, occasionally missed or garbled video data is generally easily tolerated and of little hindrance to video conferencing sessions.

FIG. 1 is a simplified schematic diagram of computers exchanging information without a firewall. Computers 100 and 102 establish a TCP connection after exchanging handshake signals 104. With reference to videoconferencing standards, e.g., H.323, multiple UDP port numbers are established for communication of the audio and video data. At least 4 UDP ports, 108-1 through 108-4 and 110-1 and 110-4, for each of computers 100 and 102, respectively, are opened for the audio and video control/data signals. Typically more than four ports are opened for each of computers 100 and 102 as illustrated by ports 108n and 110n.

However, many office and home networks are protected within firewall environments. As is generally known, firewalls are designed to keep out unwanted Internet Protocol (IP) traffic from a network by restricting the number of ports being unblocked. This creates a problem for videoconferencing standards as the videoconferencing standards require a large number of TCP and UDP ports to be unblocked. FIG. 2 is a simplified schematic diagram of two computers communicating through a firewall. As illustrated in FIG. 2, computer 100 is behind firewall 112 and computer 102 communicates with the firewall over network 114. As mentioned above, firewall 112 does not allow the multiple port opening required by a UDP connection. Furthermore, since firewall 112 limits the ports being unblocked, the firewall will not recognize any UDP ports, such as UDP port numbers 1024-65,538, all of which may be used for a videoconference application.

When rapid, real-time transmission is desired, a firewall can and often does limit or prevent desired video conferencing capability. If a particular firewall blocks or denies all incoming Internet traffic except TCP/IP, then videoconferencing or any other data exchange, must be conducted using highly reliable, but much slower, TCP/IP, or some workaround must be established to conduct UDP data transmission and exchange. One attempt to address this shortcoming is the use of a TCP/IP connection for the data. However, the TCP connection results in poor quality video due to transmissions of acknowledgement, verification, and requests for the retransmission of missed packets, i.e., the reliability characteristics of the TCP connection.

In view of the foregoing, what is needed is a method and system of communicating videoconference data through existing firewalls with minimal impact on the audio/video data transmission, or on the system administrator's burdens of administration.

SUMMARY OF THE INVENTION

Broadly speaking, the present invention fills these needs by providing a method, system and communication protocol for tunneling data through a single HTTP port in order to pass through a firewall configured to limit the number of unblocked ports for transmitting data. Embodiments of the present invention provide for an apparently stateful TCP connection in which it is less likely that certain firewalls will mistake the tunneled TCP packets as "out of state" and drop them. The present invention can be implemented in numerous ways, including as a system, a method, or a computer readable media. Several embodiments of the present invention are described below.

In one embodiment, a method for tunneling data associated with a packet based multimedia communication standard is provided. The method includes intercepting a library call associated with the multimedia communication standard, and registering identification data associated with the library call. The method further provides for adding a Transmission Control Protocol/Internet Protocol (TCP/IP) header over a pre-existing header of a data packet related to the identification data. The method then includes transmitting the data packet having the (TCP/IP) header through a firewall. The TCP/IP header includes a TCP SEQ number and a TCP ACK number.

In another embodiment, a method for communicating port traffic through a single Hypertext Transfer Protocol (HTTP) port is provided. The method provides a series of operations, including: establishing a connection between a first and second computing device; transmitting allocation data associated with the port traffic to a tunneling driver; segmenting the port traffic into datagrams; appending a first header to each one of the datagrams; and appending a Transmission Control Protocol/Internet Protocol (TCP/IP) header over the first header. The TCP/IP header includes a TCP SEQ number and a TCP ACK number and is configured to direct each one of the datagrams to the single HTTP port.

In a further embodiment, a computer readable medium having program instructions for tunneling data associated with a packet based multimedia communication standard is provided. The computer readable medium includes program instructions for intercepting a library call associated with the multimedia communication standard, and program instructions for registering identification data associated with the library call. Also provided are program instructions for adding a Transmission Control Protocol/Internet Protocol (TCP/IP) header over a pre-existing header of a data packet related to the identification data, and program instructions for transmitting the data packet having the TCP/IP header through a firewall. The TCP/IP header is a simulated stateful TCP/IP header and includes a TCP SEQ number and a TCP ACK number.

In yet another embodiment, a computer readable media having program instructions for communicating port traffic through a single Hypertext Transfer Protocol (HTTP) port is provided. The computer readable media includes program instructions for establishing a connection between a first and second computing device. The computer readable media further includes program instructions for transmitting allocation data associated with the port traffic to a tunneling driver, and program instructions for segmenting the port traffic into datagrams. Further, the computer readable media includes program instructions for appending a first header to each one of the datagrams, and program instructions for appending a Transmission Control Protocol/Internet Protocol (TCP/IP) header over the first header. The TCP/IP header is a simulated stateful TCP/IP header having a TCP SEQ number and a TCP ACK number and is configured to direct each one of the datagrams to the single HTTP port.

In still yet another embodiment, a system for tunneling port traffic destined for multiple ports through a single port is provided. The system includes a server configured to transmit data packets each having a tunneling header in addition to a packet header, and a firewall limiting a number of unblocked TCP ports. The firewall is capable of analyzing the tunneling header. The tunneling header is associated with the single port so that the firewall allows the data packets to pass through. Further, the system includes a client configured to receive the data packets from the firewall through the single port. The client is further configured to identify a flag and a checksum associated with the tunneling header in order to strip the tunneling header for access to the packet header. The tunneling header is stateful, having a TCP SEQ number and a TCP ACK number.

Advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

FIG. 1 is a simplified schematic diagram of computers exchanging information without a firewall.

FIG. 2 is a simplified schematic diagram of two computers communicating through a firewall.

DETAILED DESCRIPTION OF THE PREFERRED EMBODIMENTS

Figure 3:
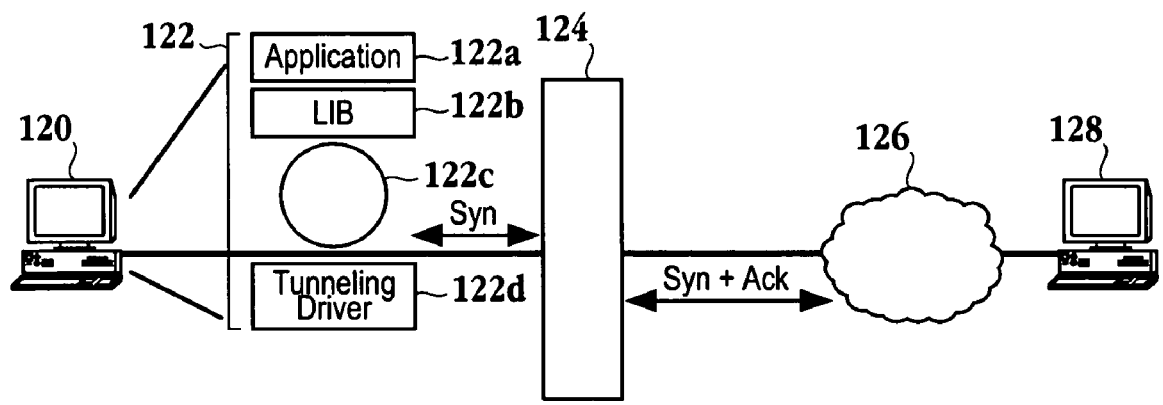
FIG. 3 is a simplified schematic diagram of a system that includes a modified application module stack which may be integrated with a connectionless transmission control protocol scheme in order to provide both unreliable and reliable connection capability in accordance with one embodiment of the invention.

An invention for a method and system for tunneling data for multiple TCP/UDP ports through a single, "stateful" TCP port for passage through a firewall are provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention. FIGS. 1 and 2 are described in the "Background of the Invention" section.

In related application Ser. No. 10/681,523, an invention is described in which a single tunneling TCP connection is established through which multiple TCP and UDP connections are channeled for transmission in a firewall environment. Embodiments of the present invention build on the previous "stateless" TCP connection to provide a simulated "stateful" TCP connection in which it is less likely that certain firewalls will mistake the tunneled TCP packets as "out of state" and drop them. As used herein, the term "stateful" TCP connection signifies the tunneling packets follow the proper TCP connection states. "Stateful" consists of initial handshake between 2 hosts (SYN, SYN+ACK, and ACK), data packets transfer with proper Seq # and Ack # values with PSH+ACK or ACK flags set, and disconnection message exchange (FIN+ACK and ACK packets) with proper Seq # and Ack #. In a connectionless TCP data exchange as described in related application Ser. No. 10/681,732, all packets from initiating host have SYN flag set and all packets from the remote host have SYN+ACK flag set. The Seq # and Ack # values, if any, remain the same throughout the session.

Due to security concerns, the firewall is an essential component of most systems and networks with Internet access, and is a valuable tool for safeguarding data and maintaining system integrity. However, increased security impacts the data exchange speed. While every firewall has its own characteristic methods for establishing and maintaining a desired level of security, it is common for firewalls to deny or block access to all but Transmission Control Protocol/Internet Protocol (TCP/IP) transmission, or to designate only certain ports or a range of ports for UDP data exchange. Still other firewalls require stateful TCP connections or the packets will be dropped as out of state, or worse, mistaken for a virus attack.

The embodiments discussed herein provide a scheme for tunneling data associated with a multimedia teleconferencing standard, e.g., H.323, SIP or any other suitable packet based standard, through a single HTTP port. One of the most common problems for H.323 applications connecting to another H.323 client, or to an H.323 conference server from an office or home network, is that most sites are protected by a firewall. The firewall is designed to keep out unwanted IP traffic from a given network. However, the H.323 protocol requires a large number of TCP and UDP ports to be unblocked in order for it to work properly (e.g., all UDP ports from 1024-65538 need to be unblocked). Opening so many ports compromises the security of the local network.

One solution is to install a special firewall that works with H.323 protocol. Unfortunately, not many sites have this kind of firewall, nor is such a specialized firewall a practical solution. On the other hand, most firewalls (if not all) do open an HTTP port for generic web browsing. The HTTP port, in effect, is a TCP connection on port 80. If an H.323 application can be configured to tunnel all TCP and UDP connections into a single TCP connection on port 80, the application will be able to communicate with another H.323 application that is similarly configured to convert the packets back to the originally transmitted data outside of the firewall.

Through the combination of proxy socket library calls and a kernel mode device driver that is inserted in the operating system (OS) TCP/IP stack, existing multimedia teleconferencing applications require minimal code modification. As will be explained below, the tunneling driver is sandwiched between the TCP/IP driver and a network interface card (NIC) driver. Thus, the IP datagram transformation discussed below is hidden from both drivers. Consequently, the TCP/IP driver and the NIC driver function as though there is not another driver between them.

FIG. 3 is a simplified schematic diagram of a system that includes a modified application module stack which may be integrated with a connectionless transmission control protocol scheme in order to provide both unreliable and reliable connection capability in accordance with one embodiment of the invention. Client 120 sits behind firewall 124. Server 128 communicates with client 120 through network 126 and firewall 124. In a multi-media teleconferencing application, e.g., H.323 application, at least two types of connections are required. That is, reliable connections are required for call set up and call control data, while unreliable connections are required for transmitting media data, like audio and video where data throughput is crucial. However, in order to provide reliable connections over the connectionless TCP connection, much of the packet retransmission, packet re-ordering and packet receive notification mechanisms are implemented in the TCP/IP stack that comes standard with most of the modem operating systems, i.e., MICROSOFT WINDOWS, LINUX, etc. Therefore, modified protocol stack 122 is capable of providing communication in which reliable and unreliable connections may be made for a teleconferencing application. As will be explained in more detail with reference to FIGS. 4A and 4B, the modified application stack includes the application 122*a*, a dynamic link library (dll) 122*b*, other libraries and drivers 122*c*, and tunneling driver 122*d*. Of course, module stack 122 sits over hardware such as a network card.

When a video conferencing application makes a TCP or UDP connection, the protocol and the port number will be sent to the tunneling driver in advance of the actual data transmission on those ports. In accordance with embodiments of the present invention, a master tunneling TCP connection is established, as described in greater detail below.

Figure 4A:
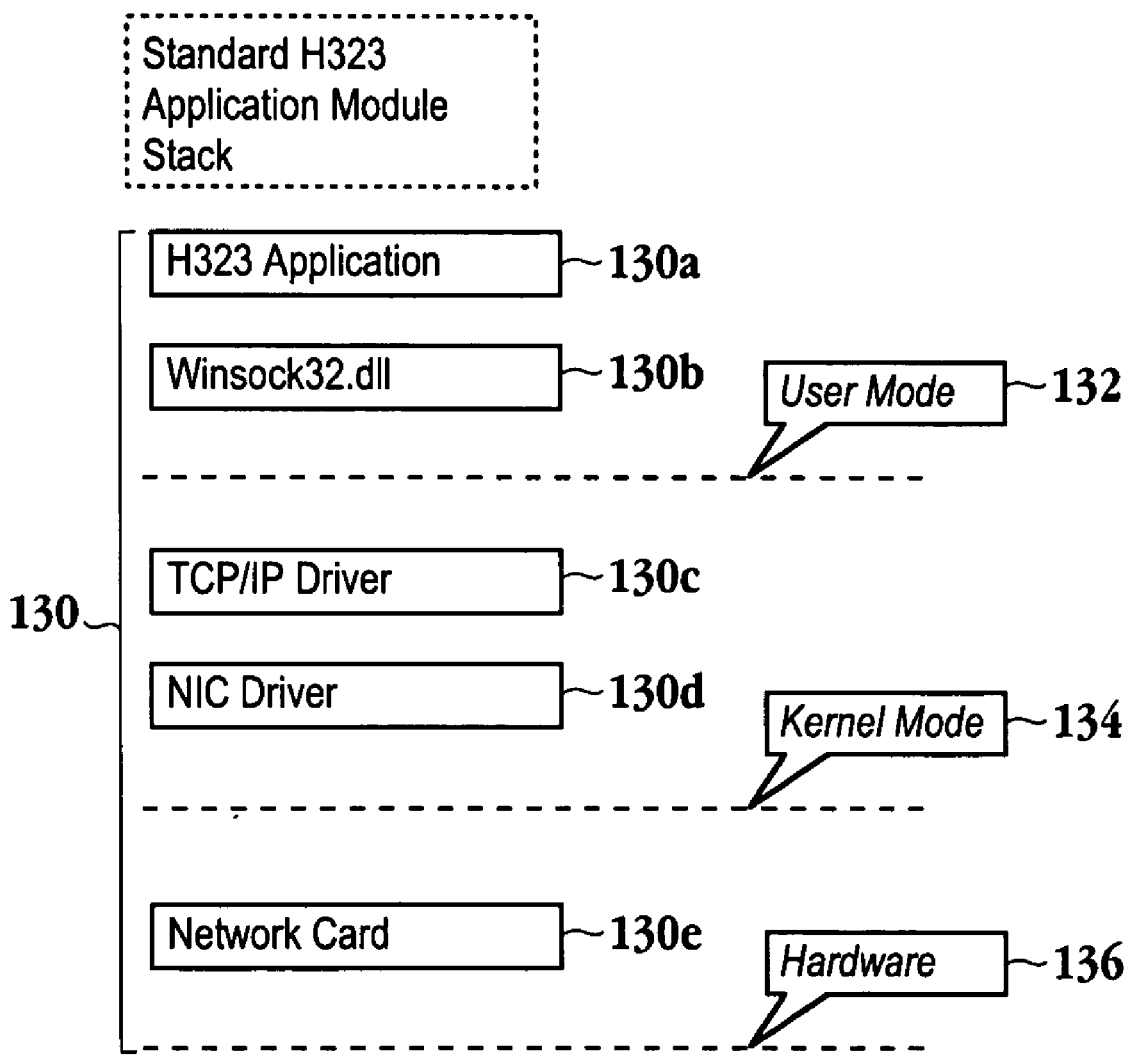
FIG. 4A is a simplified schematic diagram illustrating the module stack for a standard H.323 application module.

FIG. 4A is a simplified schematic diagram illustrating the module stack for a standard H.323 application module. Module stack 130 includes H.323 application 130*a*, which sits above Winsock32.dll 130*b*. As is generally known, Winsock32.dll is a dynamic link library, which is a collection of small programs, any of which may be called when needed by a larger program that is running on the computer. H.323 application 130*a* and Winsock32.dll 130*b* sit at the application level or user mode 132. In kernel mode 134, also referred to as the driver level, TCP/IP driver module 130*c* sits over network interface card (NIC) driver module 130*d*. At hardware level 136 is network card 130*e*.

Figure 4B:
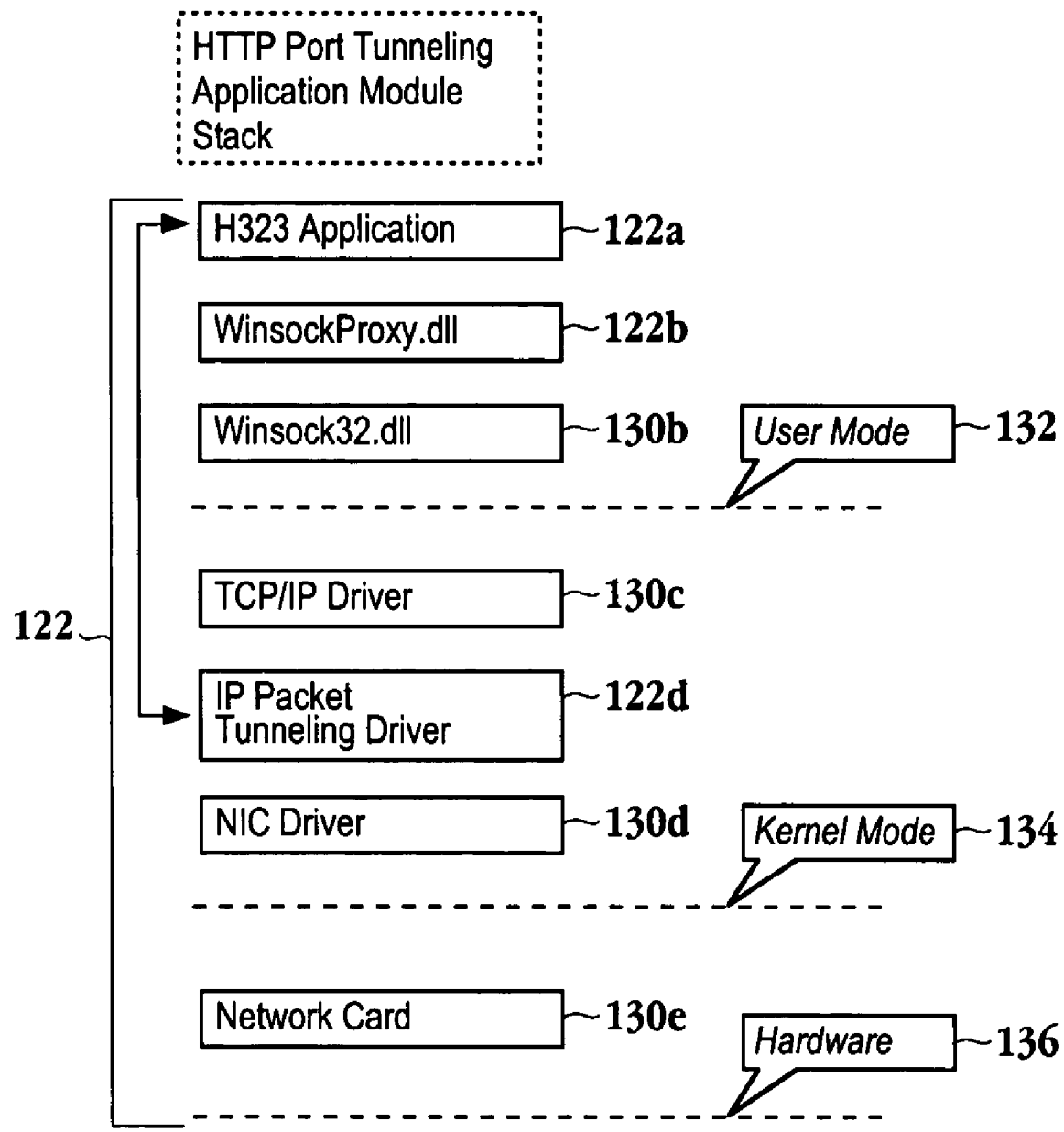
FIG. 4B is a simplified schematic diagram illustrating a port tunneling application module stack in accordance with one embodiment of the invention.
Figure 6A:
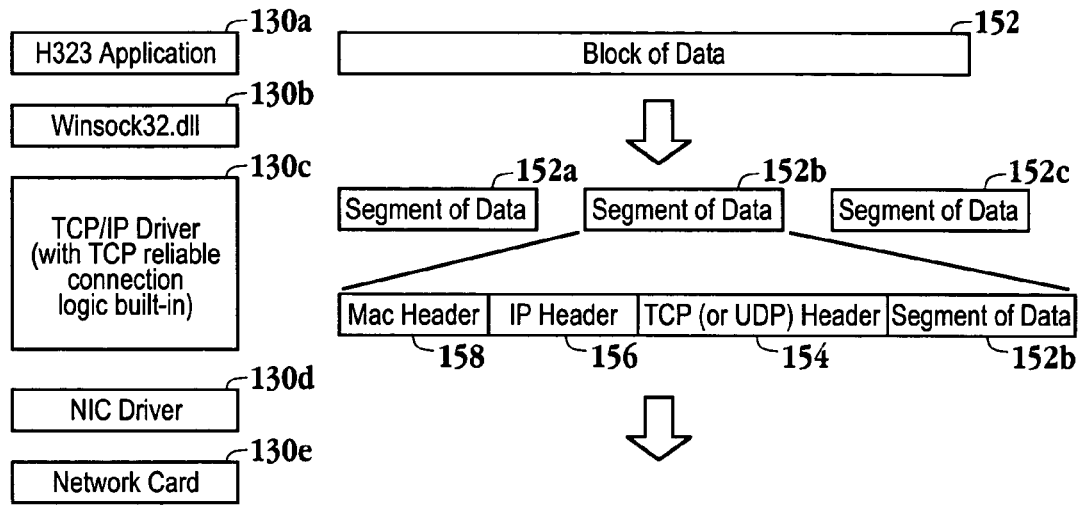
FIG. 6A illustrates the segmentation of an incoming block of data through the standard application module stack.
Figure 6B:
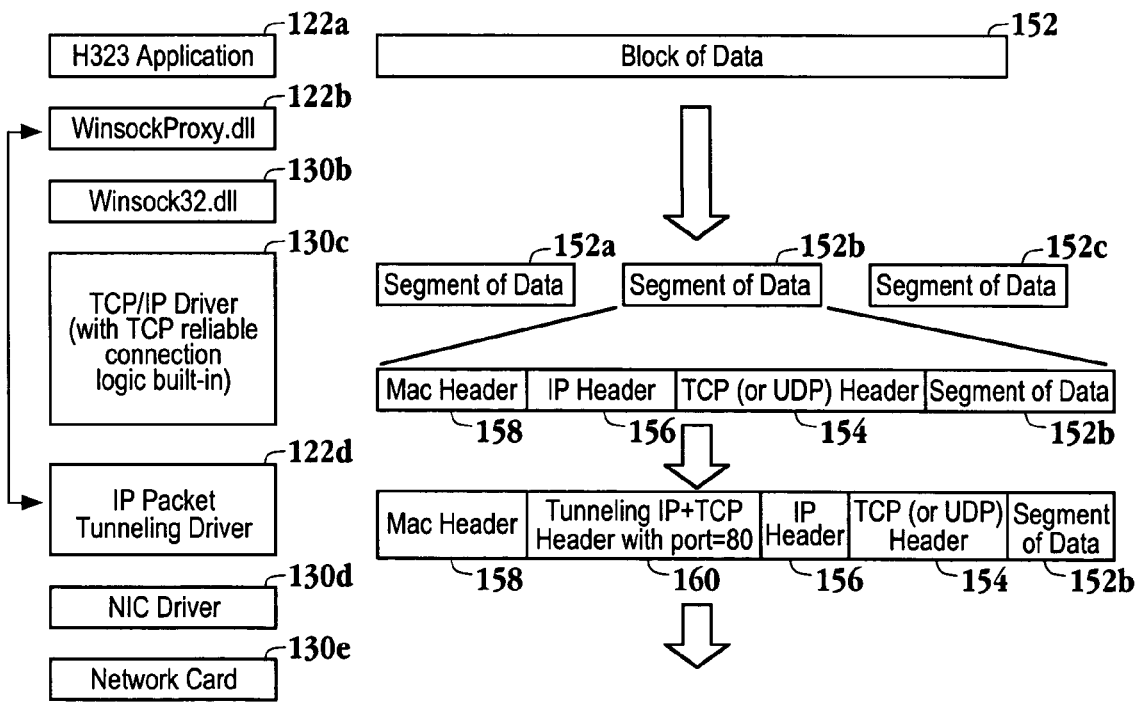
FIG. 6B illustrates the segmentation and the header addition for the modified application module stack to enable tunneling of the data through a firewall in accordance with one embodiment of the invention.

FIG. 4B is a simplified schematic diagram illustrating a port tunneling application module stack in accordance with one embodiment of the invention. The port tunneling application module stack includes an extra module at the application level and an extra module at the driver level as will be explained further below. As illustrated in FIG. 4B, application module 122*a*, which may be any suitable multimedia teleconferencing application, sits above Winsockproxy.dll 122*b*. Application module 122*a* links with Winsockproxy.dll 122*b*. When application module 122*a* makes a standard socket library call, e.g., bind(), connect(), closesocket(), etc., Winsockproxy.dll 122*b* intercepts the calls and communicates with IP packet tunneling driver 122*d* in order to register/deregister a port number and protocol type that the application module allocates. Thus, in advance of sending communication data from the application level through Winsock32.dll module 130*b* to the driver level, Winsockproxy.dll module 122*b* communicates with tunneling driver 122*d*. The communication data is passed from Winsockproxy.dll 122*b* to Winsock32.dll 130*b*, and eventually to the driver level, or kernel mode 134, where TCP/IP driver 130*c* initially receives the data. The TCP/IP driver then breaks up the data into packets, or segments, of appropriate size, also referred to as datagrams, as illustrated in FIGS. 6A and 6B. In addition, the TCP/IP driver appends the appropriate media access control (MAC), IP and TCP (or UDP) headers to the datagrams depending on the socket type. TCP/IP driver 130*c* passes the packets to IP packet tunneling driver 122*d*. Packet tunneling driver 122*d* checks the TCP/UDP port and determines if the port is on the registered port number and protocol type list.

It should be appreciated that the earlier communication from Winsockproxy.dll module 122*b* to tunneling driver 122*d* will register the port number and protocol type. If the port number and protocol type are on the list, tunneling driver 122*d* inserts a 40 byte tunneling IP+TCP header to the datagram, as illustrated with reference to FIG. 6B. In addition, tunneling driver 122*d* checks the destination IP of the datagram. If the destination IP is on the firewall IP mapping table, then tunneling driver 122*d* replaces the destination IP and port number in the tunneling IP+TCP header with the firewall IP and firewall port. Thereafter, a checksum is recalculated for the datagram before sending it to NIC driver 130d. Subsequently, the data is sent from NIC driver 130d to a network card 130e at hardware level 136.

When the H.323 application 122a exits or is done with a session, it calls closesocket() function for each TCP or UDP socket the application 122a has opened during the session. The WinsockProxy.dll library 122b intercepts this closesocket() function call, and passes the information to the tunneling driver 122d. The Tunneling driver 122d marks the port for deletion. Then, the tunneling driver 122d monitors for FIN+ACK and ACK packet for that port. After a timeout period (20 seconds in one embodiment), Tunneling driver 122d removes the corresponding port and protocol information from its table and also cleans up any firewall IP and firewall port mapping if necessary.

Figure 5:
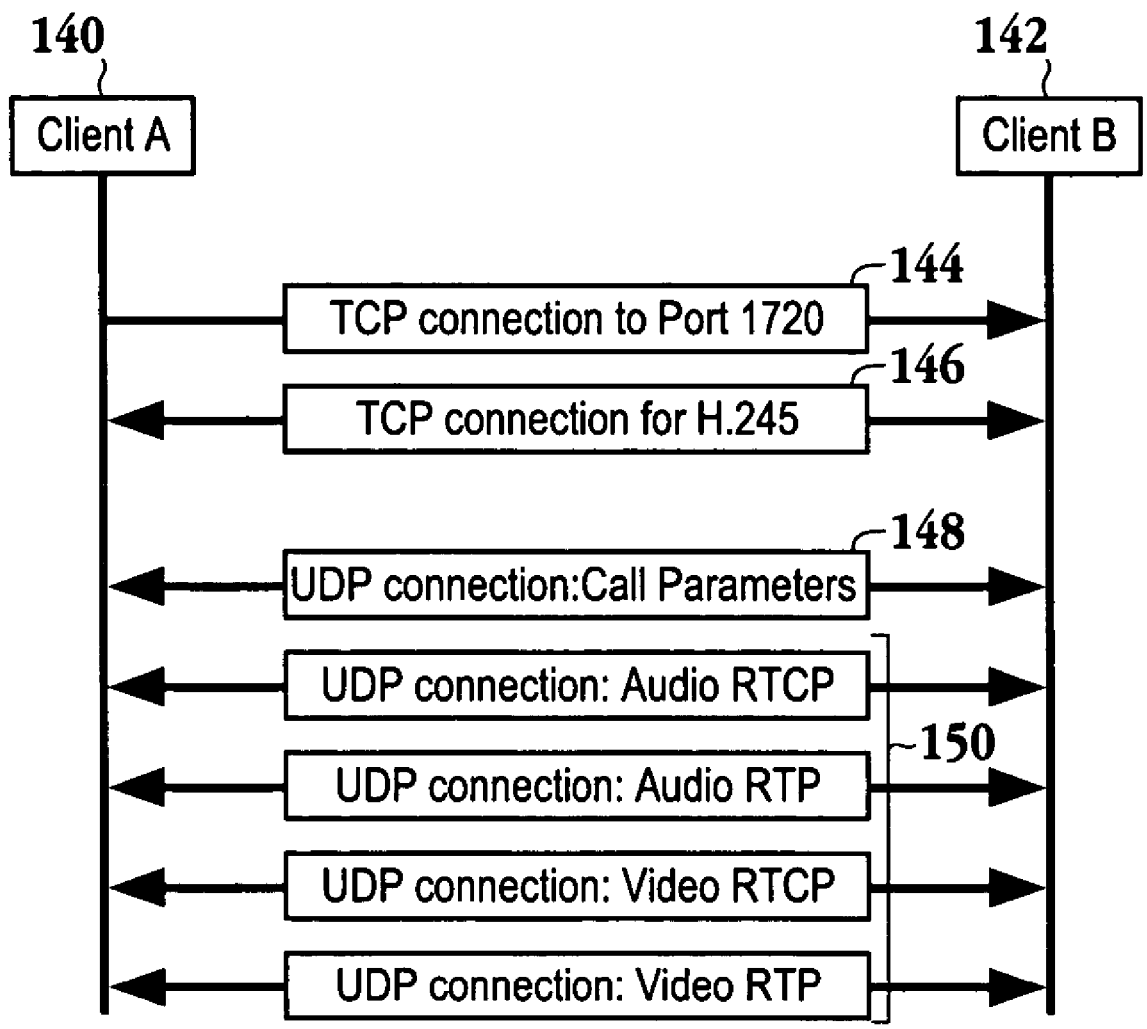
FIG. 5 is a simplified schematic diagram illustrating a typical H.323 TCP/UDP connection sequence.

FIG. 5 is a simplified schematic diagram illustrating a typical H.323 TCP/UDP connection sequence. Here, an H.323 application makes a TCP/IP connection to another H.323 application that is listening on TCP port 1720. For example, client A 140 requests a TCP connection to port 1720 through transmission 144 to client B 142. Call setup and call control transmission 144 and 146 proceed over reliable connections. Then, in subsequent data exchange, both applications may open up more TCP and UDP ports for control data and media data transmission, as illustrated by modules 150. Thus, with reference to FIG. 4A, the H.323 application writes data into an open socket (either TCP or UDP), and the Winsock32.dll module passes this data to the TCP/IP driver.

FIG. 6A illustrates the segmentation of an incoming block of data through the standard application module stack. Here, incoming block of data 152 is divided into segments of data represented by blocks 152a through 152c. As can be seen, the standard application module stack passes incoming block of data 152 through Winsock32.dll 130b to TCP/IP driver 130c, which segments the data. In addition, a header is added to each segment of data 152a, 152b, and 152c. Thus, as illustrated, segment of data 152b includes a header having a TCP (or UDP) header 154, IP header 156 and MAC header 158.

FIG. 6B illustrates the segmentation and the header addition for the modified application module stack to enable tunneling of the data through a firewall in accordance with one embodiment of the invention. Incoming block of data 152 is segmented to data segments 152a through 152c. Each of the data segments 152a, 152b, 152c, has a header added, as discussed above with reference to FIG. 6A. Thereafter, IP packet tunneling driver 122d takes each segment of data 152a, 152b, 152c, having the header and adds a tunneling header. As illustrated, segment of data 152b includes TCP (or UDP) header 154, IP header 156 and tunneling IP+TCP header 160, which has been inserted between MAC header 158 and IP header 156. In one embodiment, tunneling header 160 is a 40-byte header that indicates a specific Hypertext transfer protocol (HTTP) port number, e.g., port number 80, or any other well-known port, such as 23 for telnet.

Figure 7:
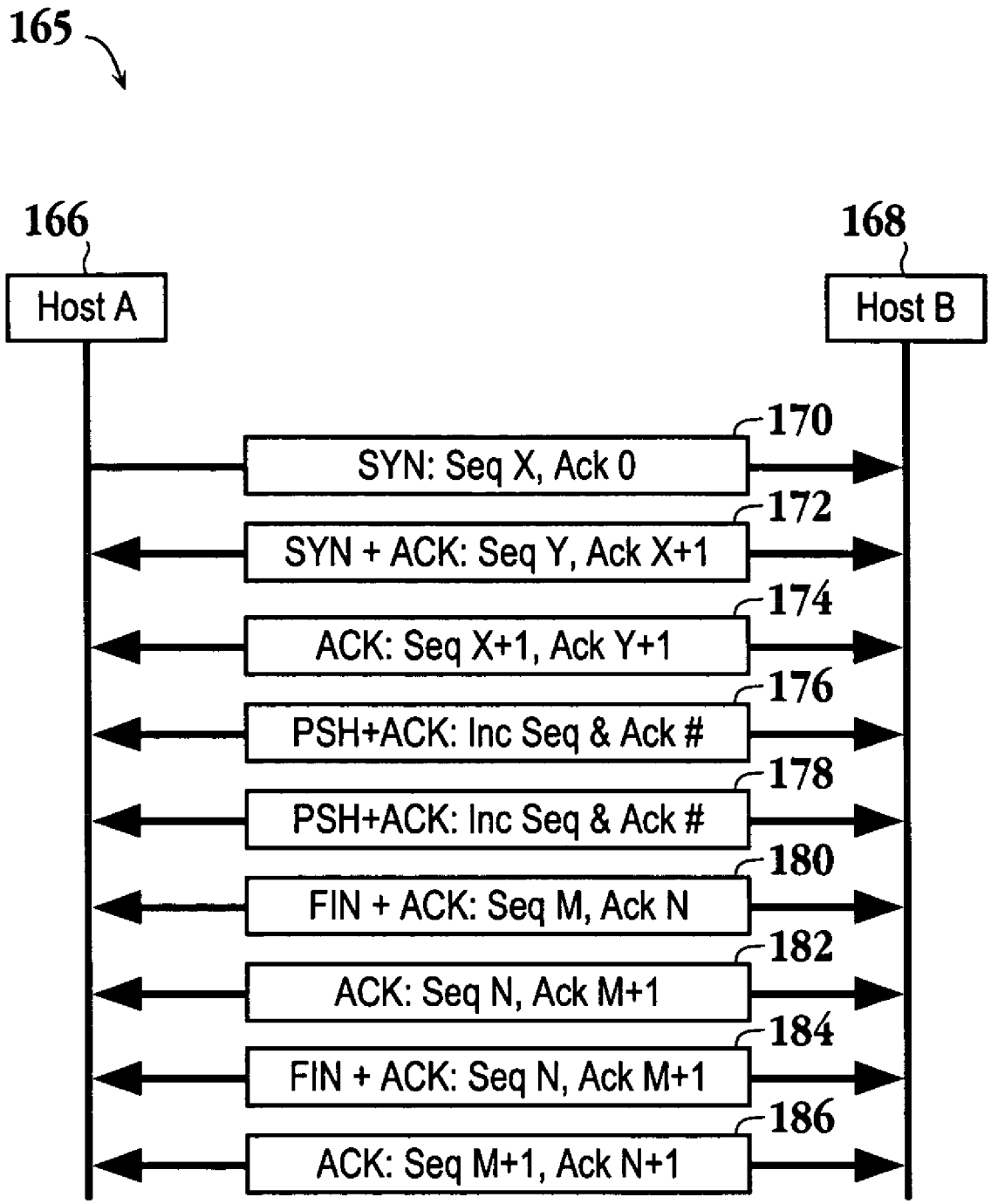
FIG. 7 is a schematic diagram of the handshake sequence and connection states followed in a typical TCP connection between an exemplary Host A and Host B.

In order to create a stateful TCP connection for channeling multiple streams of TCP and UDP connections into one, the TCP connection needs to be initiated with a SYN, SYN+ACK, ACK handshake sequence, as described in more detail below in reference to FIG. 7. The subsequent data transmission using the tunneling TCP connection requires the data to be encapsulated within a TCP/IP header that has proper IP ID, TCP SEQ number, ACK number, and TCP flag fields used in the initialization handshake. The fields are illustrated and described in greater detail below in reference to FIG. 8. Further, when the H.323 session is ended and the tunneling TCP connection is to be closed, the FIN+ACK and ACK packets need to be transmitted to the other party for proper closing of the connection.

Figure 8:
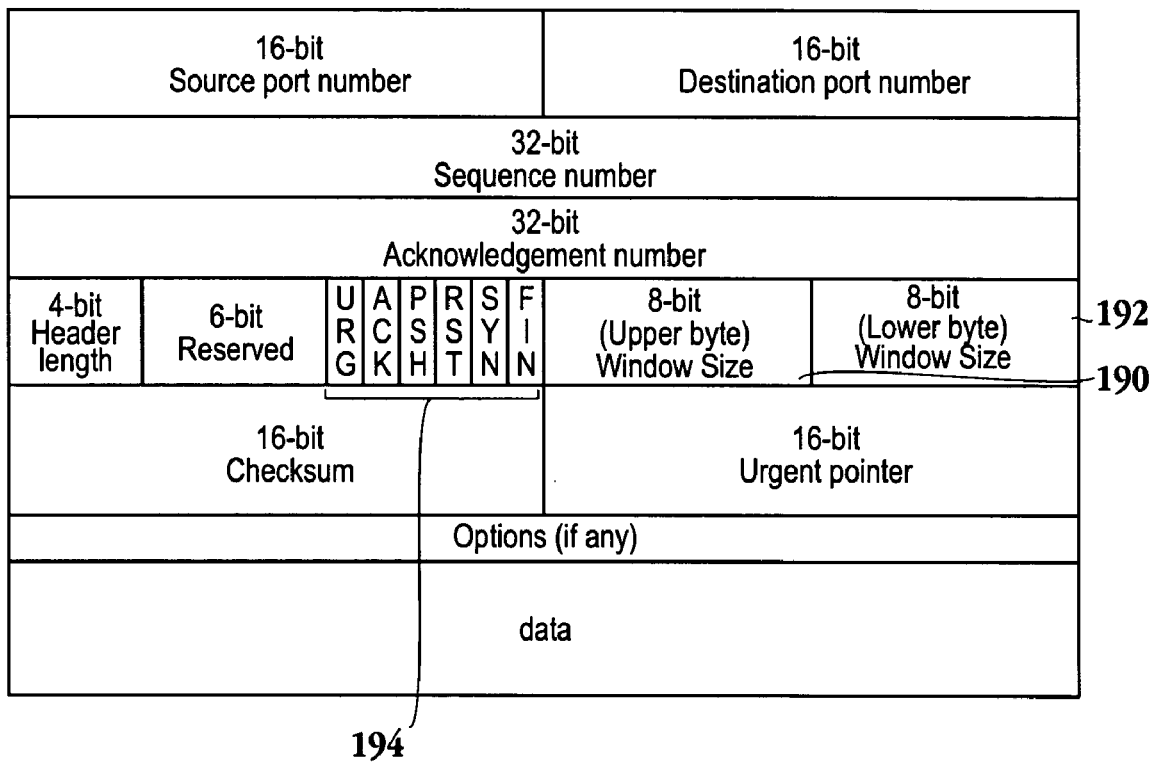
FIG. 8 is a simplified schematic diagram of a connectionless TCP header in accordance with one embodiment of the present invention.

In order to mimic a regular TCP connection, a connection must be established between 2 hosts. One way to establish the necessary connection is to create a specific, unique packet handshake mechanism. Embodiments of the present invention, however, provide for creating a regular TCP connection between the hosts. FIG. 7 is a schematic diagram 165 of the handshake sequence and connection states followed in a typical TCP connection between Host A 166 and Host B 168. In accordance with embodiments of the present invention, the SEQ and ACK fields, see FIG. 8, are assigned initial values randomly by the TCP/IP driver 130c, and then incremented and tracked in order to simulate a stateful connection. As illustrated in greater detail below, normal TCP protocol calls for a handshake of SYN 170, SYN+ACK 172, and ACK 174 between Host A 166 and Host B 168 as illustrated in order to establish the TCP connection. The initial SEQ values are illustrated as X and Y, and the initial ACK value is 0. In accordance with TCP protocol, the SYN and ACK values increment as shown.

In one embodiment, UDP data grams, such as those containing the audio and video data in a video conference, are transmitted and processed as fast as possible in order to maintain the steady and constant stream of video and audio data. In one embodiment of the present invention, UDP data grams are therefore packaged and processed as PSH+ACK packets, as illustrated by 176 and 178 in FIG. 7. In order to maintain the stateful TCP connection, the PSH+ACK packets include appropriately incremented SEQ and ACK values.

In one embodiment of the invention, the stateful TCP connection is closed according to standard TCP protocol. As illustrated in FIG. 7, a final handshake sequence includes FIN+ACK 180, ACK 182, FIN+ACK 184, and ACK 186. As illustrated in FIG. 7, the SEQ values have been set to variables M and N, representing those values arrived at over the course of the session, and the variables M and N are appropriately incremented according to the TCP protocol to close the session.

The goal of the stateful tunneling TCP connection is to mimic the same state transition as a single regular TCP connection. The approach implemented in embodiments of the present invention includes creating a master tunneling TCP connection between the client and the server before any H.323 TCP and UDP data is sent across the network. In one embodiment, state information (e.g., flags, ID, SEQ #, ACK #, etc) is recorded during the setup of the master tunneling TCP connection. When the H.323 application starts sending data through TCP or UDP ports, the tunneling driver appends the tunneling TCP header with fields being set to closely mimic the behavior of a "regular" TCP connection. When the application is done with the H.323 session, the WinSockProxy.dll closes the master tunneling TCP connection after all of the other TCP and UDP connections related to this H.323 session are closed. When the tunneling driver receives the FIN+ACK packets from the master tunneling TCP connection, the driver modifies the SEQ # and ACK # fields so that those packets will get through the firewall and reach the host on the other end of the connection. When the host on the other end of the connection receives the FIN+ACK packets, it modifies the SEQ # and ACK # back to their original values before they are passed to the TCP/IP stack driver.

In one embodiment of the invention, the WinSockProxy.dll 122b (see FIGS. 4B, 6B) keeps track of the peer IP addresses to which the H.323 application is connected. When the H.323 application attempts a TCP connection to a remote host, the WinSockProxy.dll will determine if there is a master connection already established to this remote host. If so, the connection count for this remote host is incremented. If not, a master tunneling TCP connection to the remote host is created before the intended TCP connection is established, and the connection count is set to 1. As used throughout the present description, the connection count is the number of TCP connections having the same remote host IP address destination. In one embodiment, the connection count is used by the WinSockProxy.dll to determine when to close the master tunneling TCP connection, e.g., when the connection count get downs to zero, as described in greater detail below. Embodiments of the present invention use TCP port 4824 as the special master tunneling port, but it should be appreciated that any appropriate port can be so utilized.

FIG. 8 is a simplified schematic diagram of a connectionless TCP header 188 in accordance with one embodiment of the present invention. The connectionless TCP header 188 is similar to a regular TCP header, with the window size field being modified. The window size field has been subdivided into upper byte section 190 and lower byte section 192. In one embodiment of the invention, a pre-defined value is written to upper byte 190 of the window size field, and a checksum is written to lower byte 192 of the window size field. The pre-defined value and the checksum identify the datagram as a connectionless TCP/IP datagram. That is, the pre-defined value written to upper byte 190 of the window size field identifies the datagram as a connectionless TCP/IP transmission, differentiating the datagram from standard TCP/IP transmissions. In addition to the pre-defined value in upper byte 190 of the window size field, lower byte 192 of the window size field carries a special checksum to verify and confirm that the datagram is a connectionless TCP/IP datagram. In one embodiment, if the pre-defined value in upper byte 190 of the window size field identifies the received packet as a connectionless TCP/IP datagram, and the checksum in lower byte 192 of the window size field of a connectionless TCP/IP header validates the identification, the datagram will be treated and processed as a connectionless TCP/IP transmission.

Embodiments of the present invention further utilize state fields 194 to create a stateful TCP connection according to TCP protocols described above in reference to FIG. 7. Further details on the general configuration of the connectionless TCP header may be found in U.S. patent application Ser. No. 10/681,732, which has been incorporated by reference.

In one embodiment, in order to keep track of the tunneling TCP connection's state, the tunneling driver creates a connection state entry for each tunneling connection. By way of example, the tunneling driver receives a TCP packet from the TCP/IP stack with a destination port number of 4824. In one embodiment of the invention, port 4824 is the master tunneling port number. If the TCP packet has the TCP flag set to SYN, and the TCP packet carries an IP address that doesn't already exist in its connection state table, the tunneling driver assumes the application intends to make a tunneling connection. The tunneling driver creates a connection state entry in its connection table and records the remote IP address, the remote port number, the local port number, the initial SEQ number, and the TCP state flag. Then, the tunneling driver changes (instead of appending) the destination port number to 80 (HTTP port), updates the TCP Window size, lower byte 192, with the checksum method, and recalculates the packet checksums. It should be noted that the Window size upper byte 190 contains a predefined value identifying the packet as a tunneling packet, as described above. In order to maintain a stateful connection, embodiments of the present invention track the running/sliding window size on both sides of the firewall. Therefore, the predefined value in the upper byte 190 of the window size field must be sufficiently large enough to accommodate the constraints of the window size. In other words, if the firewall detects the sliding window size has grown too far apart between the connections, the firewall will stop/reject TCP packets with sequence number any higher than the window size plus last ACK number. With a sufficiently large upper byte 190 window size field, the pre-defined identifying value, a sufficiently large sliding window size on the firewall is ensured.

In a typical TCP connection initialization, the TCP/IP diver 130c (see FIG. 4A) creates a TCP packet with a given port number (e.g., 4824) and sends it over the network to the destination host. The TCP/IP driver 130c at the destination host receives this TCP packet. From the port number in the TCP header (e.g. 4824) TCP/IP driver 130c knows which socket/application to dispatch the packet to, or which local socket to start initialization for connection. However, with a firewall that blocks all TCP packet traffic except for port 80, the tunneling driver 122d (see FIG. 4B) must change the original TCP packet's port number (e.g., from 4824) to port 80 in order for the packet to traverse the firewall. When the destination host receives the tunneling TCP SYN packet (e.g., 170, FIG. 7), the tunneling driver 122d at the destination host must revert the port number back to the original port number (e.g., to port 4824) from port 80. If tunneling driver 122d were not to revert the port number back to the original port number, and instead were to simply pass the TCP packet with the translated port number (port 80) to the TCP/IP driver 130c, the TCP/IP driver 130c would either dispatch the packet to the wrong application/socket or would not find an application/socket to which the packet is dispatched. In either case, the application/socket that is listening to the original TCP port number (e.g., 4824) would never receive the packet, and would not initialize properly.

In one embodiment of the present invention, when the tunneling driver 122d (see FIG. 4B) receives a tunneling TCP packet with the TCP Flag set to SYN from the network, and there is no state entry for this remote IP, the driver creates a connection state entry in the connection table. The driver records the SEQ # from the SYN packet as the initial ACK # from the remote host. The driver also sets the current tunneling connection state for this remote IP to SYN state, records the remote port number in the entry, and resets the destination port number from port 80 (HTTP port) to port 4824, the master tunneling port number. The driver then recalculates the packet checksums before passing the packet to the TCP/IP stack in the upper layer.

In one embodiment of the invention, when the tunneling driver receives a TCP packet with the TCP Flag set to SYN+ACK, and there is already a connection state entry for that remote IP address, and the state is in SYN, the tunneling driver updates the recorded Initial SEQ # to the SEQ # from the received packet and sets the state to SYN+ACK. Then the destination port number is set to port 80, and the TCP Window size field, lower byte 192 (see FIG. 8) is modified with the appropriate checksum, and the packet checksums are recalculated.

In one embodiment of the invention, when the tunneling driver receives a Tunneling TCP packet with TCP Flag set to SYN+ACK, and there is already a connection state entry for the remote IP, and the connection is in SYN state, the driver updates the connection state of the initial ACK # to the packet's SEQ #. The driver also sets the current tunneling connection state for the remote IP to SYN+ACK state, and resets the source port number from port 80 (HTTP port) to port 4824, the master tunneling port number. The driver then recalculates the packet checksums before passing the packet to the TCP/IP stack in the upper layer.

In one embodiment, when the tunneling driver receives TCP packets or tunneling TCP packets from the TCP/IP stack or from the network with ACK Flags, the driver modifies the TCP header according to the state and data in the connection state entry for that remote IP.

When regular TCP and UDP data arrives at the tunneling driver from the TCP/IP stack driver or from the network, the driver appends (removes) the tunneling TCP headers with TCP Flag set to PSH+ACK and updates the SEQ # and ACK# according to the values in the connection state entry for that remote IP. For each packet send or receive, the tunneling driver updates the latest SEQ # and ACK # to use for the new tunneling packets.

During the master tunneling TCP connection close process, the tunneling driver receives a FIN+ACK TCP packet for the master tunneling TCP connection (for port 4824) from the TCP/IP stack driver. Because the SEQ # and ACK # have been incremented since the connection establishment, the driver must replace the SEQ # and ACK # using the latest SEQ # and ACK # in the connection state entry for that remote IP address. Now the packet will get past the firewall. However, the SEQ # and ACK # need to be converted back to their original values before passing these packets to the TCP/IP stack driver. To do so, the tunneling driver modifies the SEQ # and ACK # for the FIN+ACK and subsequent ACK packets for the FIN+ACK packet to the initial SEQ # and ACK # with proper increment.

When channeling a number of unreliable UDP connections into a single TCP connection, TCP still regulates its data throughput. In an unreliable UDP connection environment, the application sends data as fast as the application or the network can handle. However, in a reliable TCP connection environment, the TCP/IP stack driver keeps a sliding window, which tells its peer how much data it has received and how much more it can send to this host before an ACK packet must be received on the peer side. When the difference between the current SEQ # and the received ACK # exceeds a predetermined number, the sliding window, the TCP/IP stack driver will suspend the current packet send operation for new data and will retransmit previously sent data until the ACK # from the remote peer side has caught up. Once the ACK # has caught up, new data transmission resumes.

To achieve the performance of the UDP connection, the tunneling TCP connection, in accordance with embodiments of the present invention, cannot suspend the packet send operation even when the peer lags behind in the ACK # count. However, when the difference between the SEQ # and the ACK # from one side exceeds the Window size, the firewall will typically discard all of the tunneling TCP packets with SEQ # that is beyond the last ACK #+Window size. The dropped packets result in significant degradation of video and audio quality. Even though the Window size can be set to essentially any desired value, the Window size has a 64 Kbytes upper limit. When applications are transmitting audio and video data, the 64K value can easily be surpassed.

In one embodiment of the present invention, in order to get around the Window size problem while retaining the performance of an unreliable UDP connection, the tunneling driver temporarily suspends incrementing the SEQ # on the sender side if the ACK # from the remote peer is lagging behind. The driver monitors the ACK # received from the remote peer. If the difference between the ACK # and the current SEQ # in the connection state entry has grown to a predefined value (a value less than or equal to 64 Kbytes), the sender will not increment SEQ # according to the new data packet's packet size. Accordingly, the firewall thinks the packets are retransmission packets of the lost packets and will not block them. Eventually, when the ACK # from the remote peer has caught up (the gap has dropped below the predefined value), the sender resumes incrementing the SEQ # on the new tunneling packets.

In the present invention, it is noted that there can be at least two approaches for determining when a H.323 session is completed. In one embodiment, the H.323 application calls a special API function to notify the WinSockProxy.dll that the H.323 session is done, and the library can begin cleaning up. In another embodiment, the WinSockProxy.dll keeps count of the number of TCP connections established during the lifetime of the H.323 session (TCP connection counting). If the count goes from 0 to X, and then goes back down to 0, the WinSockProxy.dll determines that the application is done with the session and closes the master tunneling TCP connection. Preferred embodiments of the present invention implement the TCP connection counting method to determine when the application is done with the H.323 session.

During the lifetime of an H.323 session, many TCP and UDP sessions are opened and closed. Since typical UDP connections are stateless and are not bound to a particular remote IP, it is difficult to track. On the other hand, a connected TCP connection is bound to a particular remote IP. It is therefore easier to identify the remote session to which a TCP connection is bound. When the H.323 application first makes a connection to a remote host, no connection entry exists for the particular IP address. The WinSockProxy.dll identifies that it is the first connection to this remote host. A master tunneling TCP connection is created, followed by a regular TCP connection. During the H.323 session, more TCP connections to this remote host are created. Since a master tunneling TCP connection already exists, the new TCP connections are channeled into the master tunneling TCP connection. When all of the TCP connections for this remote host are closed, it is assumed that the application is done with the current H.323 session and the master tunneling TCP connection is no longer required. At this time, the WinSockProxy.dll initiates cleanup of the master tunneling connection.

In one embodiment of the invention, when the WinSockProxy.dll closes the master tunneling TCP connection, the tunneling driver cannot immediately clear the connection state entry. It is possible that the FIN+ACK or ACK packets may be lost and require retransmission. However, once the connection state entry is removed from the connection state table, the tunneling driver will no longer recognize these packets. As a result, these packets will not get modified for passing through the firewall and will be dropped. Therefore, in one embodiment of the invention, when the WinSockProxy.dll closes the master tunneling TCP connection, the corresponding connection state entry is only marked for deletion. The actual removal of the entry occurs after a predefined timeout.

Although the typical H.323 scenario includes both clients sending data to one another, i.e., exchanging data packets, in some situations, one peer transmits a greater volume of data than the other. For example, if one host has deselected or turned off both audio and video for the session, there will be significantly more tunneling data transmitted from a party with audio and video turned on. In this situation, there may be insufficient opportunities for the other host to transmit an Acknowledgement number. In one embodiment of the invention, the tunneling driver detects this situation and generates a special tunneling acknowledgement packet. The special tunneling acknowledgement packet contains no data and has all attributes of a tunneling TCP packet, except in the predefined constant field in the window size (see FIG. 8, 190). In one embodiment, a separate, or distinct predefined value, different from the predefined value described that identifies the packet as a tunneling TCP packet, is provided in the upper byte of the window size field 190. In another embodiment, the special tunneling acknowledgement packet is identified as both a tunneling TCP packet and a special acknowledgement packet. In this manner, the receiving tunneling driver easily identifies the special packets, and discards them.

In yet another embodiment of the present invention, a special type of H.323 application known as a Multiple Conferencing Unit Server (MCU Server) is implemented. An MCU Server provides for multiple incoming H.323 connections. Then, all of the incoming data is processed and mixed, and a combined data stream is generated for transmission back to each individual client. In an MCU Server implementation, the tunneling system needs to recognize and differentiate between tunneling TCP stream for processing, and "regular" or "other" H.323 connection streams for normal processing.

In one embodiment for an MCU server implementation, the H.323 connection setup port (1720) is identified as a special port in the WinSockProxy.dll and in the tunneling driver. When a TCP packet comes into the tunneling driver and has the destination port set as 1720, the tunneling driver will add the remote IP for that client to a special table. The subsequent TCP and UDP packets for this remote IP will not be processed by the tunneling driver. These packets will be passed through to the network driver or to the TCP/IP stack driver unmodified.

FIGS. 9-12 are logic flow diagrams illustrating the flow of data when establishing a simulated stateful tunneling TCP connection, when conducting packet exchange using the simulated stateful tunneling TCP connection, and when terminating the simulated stateful tunneling in accordance with embodiments of the present invention.

Figure 9:
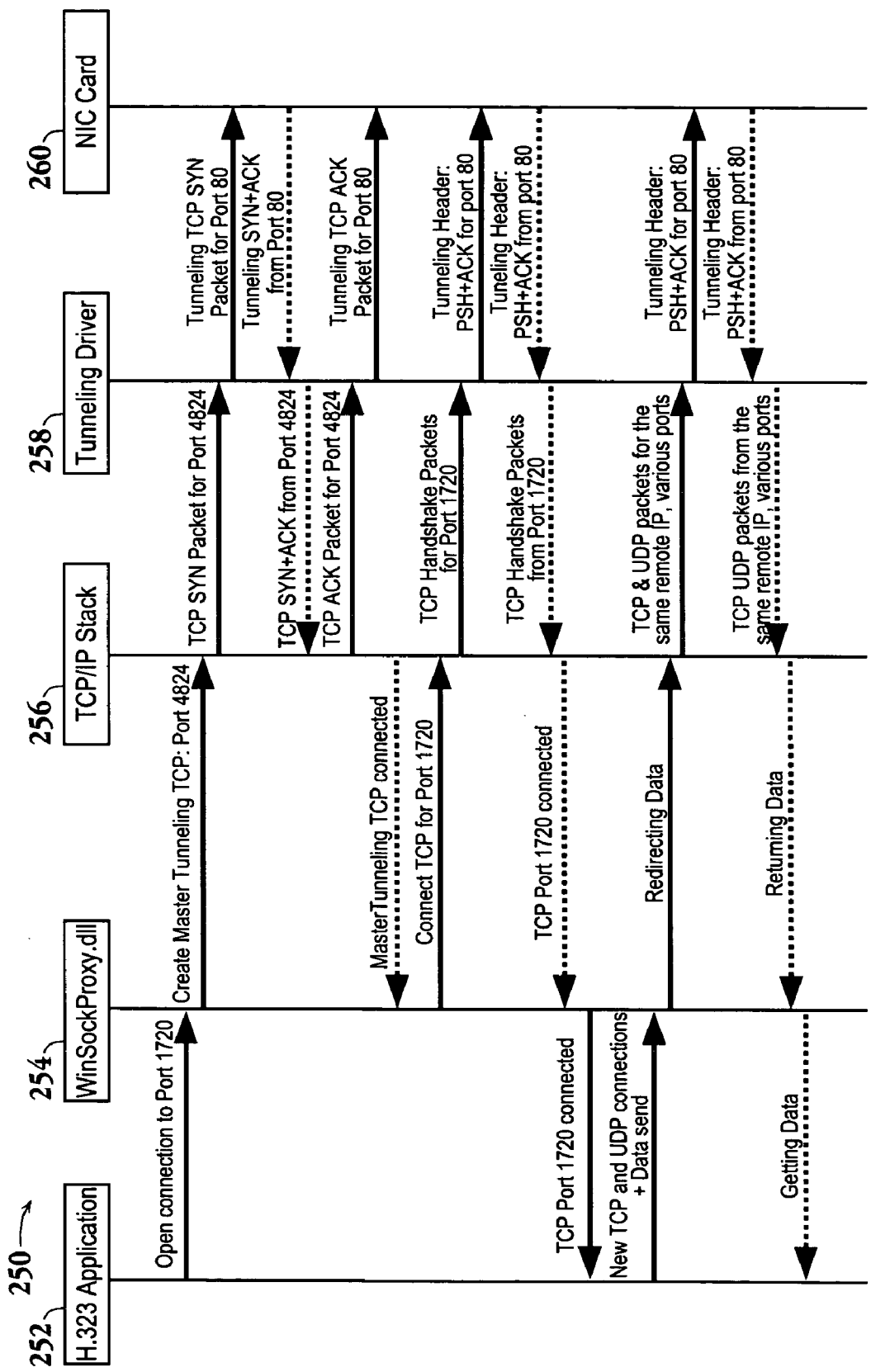
FIG. 9 is a data flow logic diagram illustrating the establishment of a master tunneling connection in accordance with an embodiment of the present invention.

FIG. 9 is a data flow logic diagram 250 illustrating the establishment of a master tunneling connection in accordance with an embodiment of the present invention. As described above, a connection is established between two hosts (e.g., see FIGS. 3 and 5), and in FIG. 9 data flow is illustrated for one host from the H.323 Application 252 through the NIC card 260. It should be appreciated that in establishing the connection that will provide the simulated stateful tunneling TCP connection, whichever host initiates the connection will essentially follow the illustrated data flow. The data flow illustrated in FIG. 9 represents the establishment of the master tunneling connection, and includes data flow at one host between and among the H.323 application 252, the Winsockproxy.dll 254, the TCP/IP stack 256, the tunneling driver 258, and the NIC card 260. FIGS. 3, 4A and 4B above graphically illustrate the identified data points. FIG. 9 highlights the events involved during the establishment of the master tunneling TCP connection. One should notice that the connection for the TCP port 1720 triggers the WinSockProxy.dll 254 to create the master tunneling connection for TCP port 4824. Then, the TCP packets resulting from the TCP port 4824 connection are processed (i.e., tunneled) by the tunneling driver 258.

Figure 10:
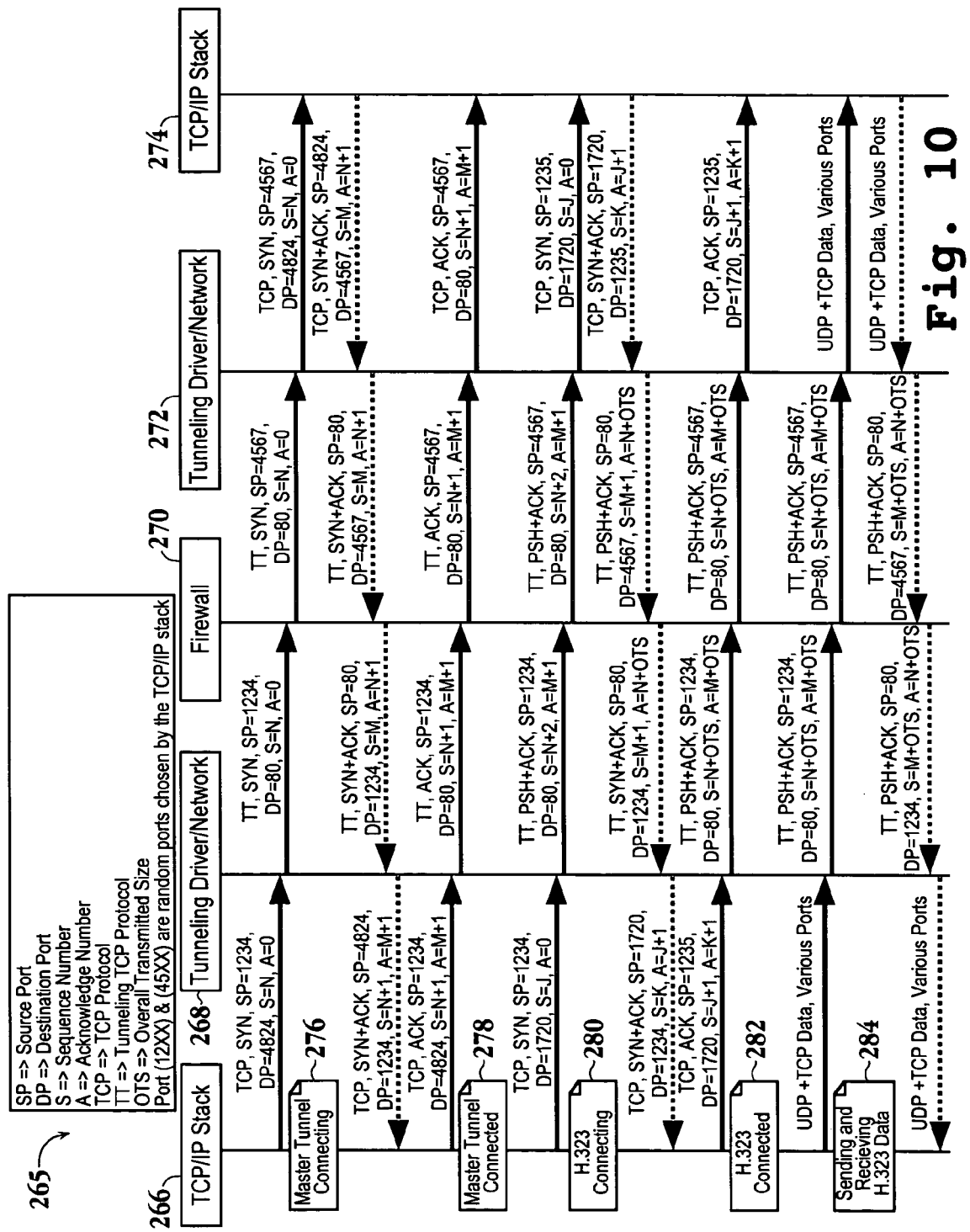
FIG. 10 is a data flow logic diagram further illustrating the establishment of a master tunneling connection in accordance with an embodiment of the present invention.
Figure 12:
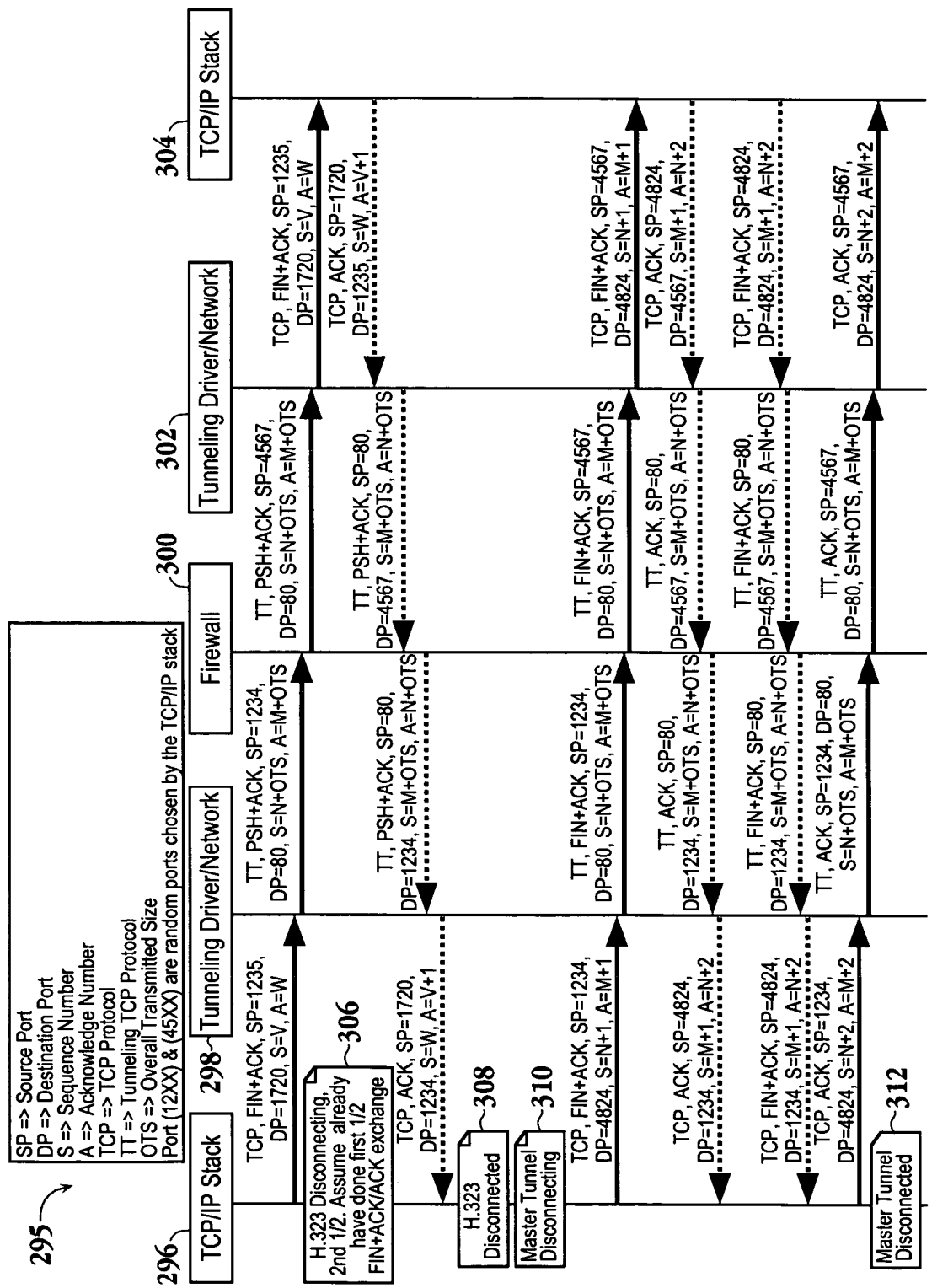
FIG. 12 is a data flow logic diagram further illustrating the termination of a master tunneling connection in accordance with an embodiment of the present invention.

FIG. 10 is a data flow logic diagram 265 further illustrating the establishment of a master tunneling connection in accordance with an embodiment of the present invention. In FIG. 10, the data flow is illustrated between the TCP/IP stack 266 of one host and the TCP/IP stack 274 of the other host. In other words, the data flow in establishing the master tunneling connection, and subsequent packet exchange, is illustrated from the TCP/IP stack 266 of the first host, to the tunneling driver/network 268 of the first host, to the firewall 270, to the tunneling driver/network 272 of the second host, and to the TCP/IP stack 274 of the second host, in accordance with an embodiment of the present invention. Further, FIG. 10 shows data flow at temporal or event points including the master tunnel connecting 276, the master tunnel connected 278, the H.323 application connecting 280, the H.323 application connected 282, and the sending and receiving of H.323 data 284. FIG. 12 highlights how the SEQ # and the ACK # changes or is updated as "regular" (i.e., not tunneling) H.323 data from multiple TCP and UDP ports is passed-through/tunneled through the master tunneling TCP connection.

Figure 11:
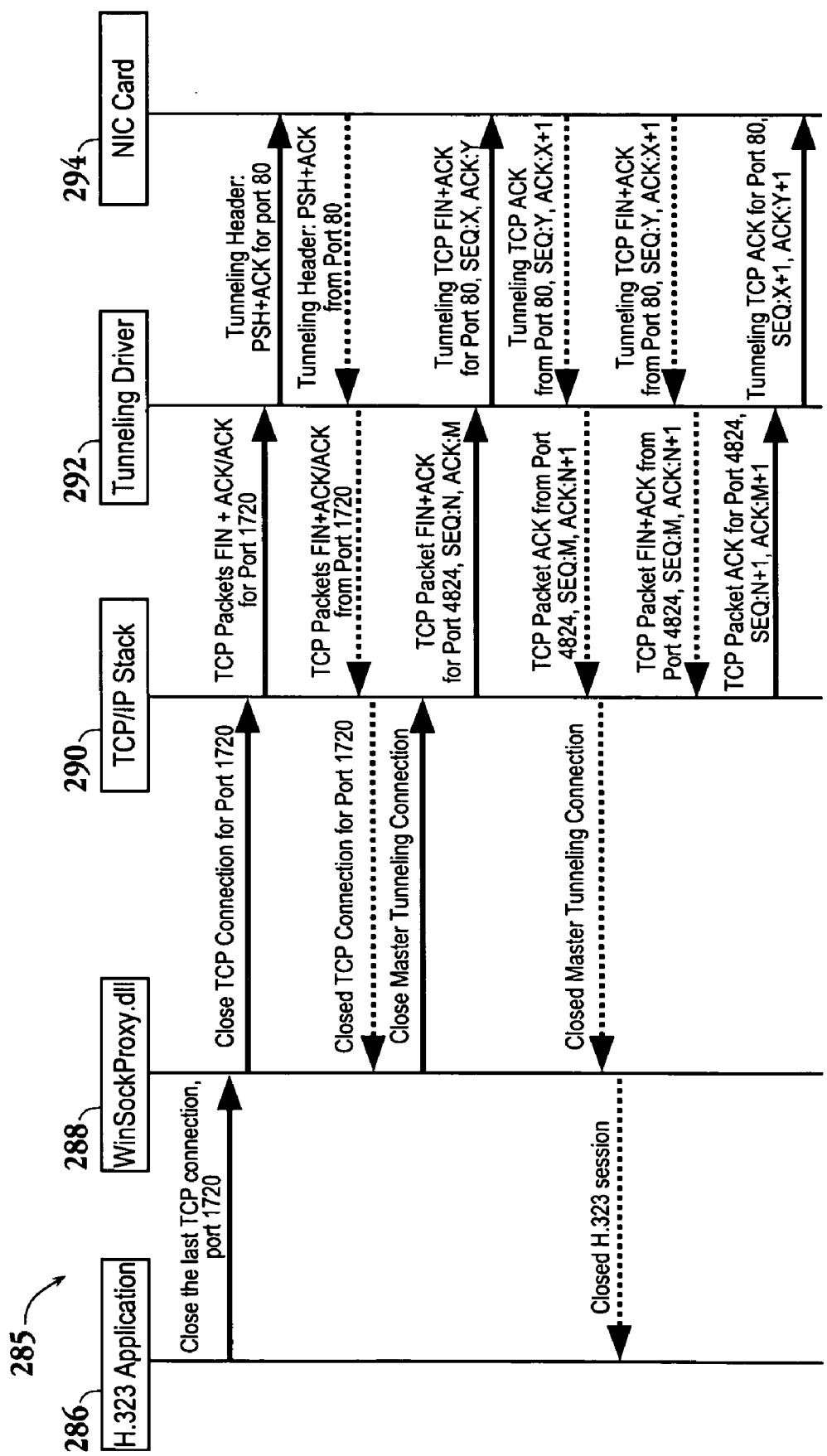
FIG. 11 is a data flow logic diagram illustrating the termination of a master tunneling connection in accordance with an embodiment of the present invention.

FIG. 11 is a data flow logic diagram 285 illustrating the termination of a master tunneling connection in accordance with an embodiment of the present invention. As described above in reference to FIG. 9, data flow is illustrated for one host from the H.323 Application 286 through the NIC card 294 of that host. It should be appreciated that in terminating an established connection, whichever host initiates the termination will essentially follow the illustrated data flow. The data flow illustrated in FIG. 11 represents the termination of the master tunneling connection, and includes data flow at one host between and among the H.323 application 286, the Winsockproxy.dll 288, the TCP/IP stack 290, the tunneling driver 292, and the NIC card 294. As described above in reference to FIG. 9, FIGS. 3, 4A and 4B above graphically illustrate the identified data points.

Finally, FIG. 12 is a data flow logic diagram 295 further illustrating the termination of a master tunneling connection in accordance with an embodiment of the present invention. In FIG. 12, the data flow is illustrated between the TCP/IP stack 296 of one host and the TCP/IP stack 304 of the other host. In other words, the data flow in terminating the master tunneling connection, and final packet exchange, is illustrated from the TCP/IP stack 296 of the first host, to the tunneling driver/network 298 of the first host, to the firewall 300, to the tunneling driver/network 302 of the second host, and to the TCP/IP stack 304 of the second host, in accordance with an embodiment of the present invention. FIG. 12 illustrates the termination of the master tunneling connection at the second or final host termination, in accordance with one embodiment. As above in FIG. 10, data flow is further shown at temporal or event points including the final H.323 disconnecting 306, the final H.323 disconnected 308, the master tunnel disconnecting 310, and the master tunnel disconnected 312 with no further packet exchange. It should be noted that FIG. 12 illustrates how the FIN+ACK and ACK packets' SEQ # and ACK # are modified as they pass through different layers of the application stack. One should recall that the FIN+ACK and ACK packets are originally for the TCP port 4824, which hasn't been incremented since the connection has established. However, the H.323 data transmissions have pushed the SEQ # and ACK # of the TCP port 4824 connection to a different value on the firewall. In order to let these FIN+ACK and ACK packets to pass through the firewall, the tunneling driver needs to modify the SEQ # and ACK # for these packets before the tunneling driver sends them to the network. On the receiving end, however, the original TCP connection is expecting the FIN+ACK and ACK packets of a different value since there has no actual data being passed through the TCP port 4824 connection. As a result, the tunneling driver needs to change the SEQ # and ACK # for these FIN+ACK and ACK packets back to their original SEQ # and ACK # after tunneling driver has received them and before passing them to the TCP/IP driver.

In summary, embodiments of the present invention enable the tunneling of TCP and UDP connections into a single, stateful TCP connection on an HTTP port, such as for example, HTTP port 80. A single, stateful, TCP connection channels all data from multiple UDP and TCP connections. Thus, a packet based multimedia conferencing application may successfully pass through a firewall protecting a client or receiver of the multimedia data. Because the connection is stateful, the firewall is less likely to mistake the tunneled TCP data packets as out of state or even as virus attacks and drop them.

The addition of two modules, i.e., WinsockProxy.dll and the tunneling driver described above, into the application module stack will achieve the functionality described herein. As described above, modifying the teleconferencing application to link to the WinsockProxy.dll module, rather than the Winsock32.dll module, enables the simulation of all function calls before calling the Winsock32.dll. It should be appreciated that all of the reliable connection mechanism is maintained through the TCP/IP driver. In one embodiment, a stateful connectionless TCP scheme may be accomplished through the tunneling embodiments described herein. Here, a UDP datagram is packaged in a stateful connectionless TCP/IP header, which appears essentially as a regular TCP/IP header and datagram. Upon receipt, the datagram is identified as a connectionless TCP/IP datagram, the connectionless TCP/IP header is stripped from the datagram, and the data is processed in accordance with the original or underlying protocol that remains after the connectionless TCP/IP header is removed. The connectionless TCP/IP header appears to be stateful with appropriately incremented SYN # and ACK #, and does not automatically initiate a response such as an acknowledgement, a verification, a request for re-transmission, and so forth.

In one embodiment, the connectionless TCP/IP header enables transmission over the Internet and other networks that may prioritize or require the TCP/IP protocol. However, the identification of the datagram as a connectionless TCP/IP datagram results in the header being stripped from the underlying datagram and precludes traditional acknowledgement and other reliability data exchange. It should be appreciated that while the embodiments describe a client server relationship, this relationship is not meant to be limiting, as the relationship may be extended to any suitable receiver and sender of data.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data that can thereafter be read and executed by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for tunneling data associated with a packet based multimedia communication standard, comprising:
   intercepting a library call associated with the multimedia communication standard;
   registering identification data associated with the library call;
   establishing a TCP tunneling connection related to the identification data;
   adding a Transmission Control Protocol/Internet Protocol (TCP/IP) header over a pre\-existing header of a all data packets related to the identification data, wherein the method operation of adding a TCP/IP header includes,
      inserting an identifying pre-defined value into an upper byte of a window size field of the TCP/IP header, and
      inserting a checksum into a lower byte of the window size field of the TCP/IP header; and
   transmitting the data packets having the (TCP/IP) header through a firewall, wherein the TCP/IP header includes a TCP SEQ number and a TCP ACK number that are incremented and tracked in order to simulate a stateful connection.

2. The method of claim 1, wherein the method operation of registering identification data associated with the library call includes,
   checking if a port number and a protocol type are defined in a table;
   if the port number and the protocol type are not defined in the table, the method includes,
   adding the port number and the protocol type to the table.

3. The method of claim 2, wherein the port number is port 80 and the protocol type is a TCP.

4. The method of claim 1, wherein the identification data includes a port number and a protocol type associated with the data packet.

5. The method of claim 1, wherein the method operation of adding a Transmission Control Protocol/Internet Protocol (TCP/IP) header over a pre-existing header further includes,
   inserting the TCP SEQ number; and
   inserting the TCP ACK number,
   wherein, after initial assignment of the TCP SEQ number, the TCP SEQ number and the TCP ACK number are determined according to the an amount of data transmitted.

6. The method of claim 1, wherein the method operation of registering identification data associated with the library call is done prior to advancing data associated with the library call from an application level of a protocol stack of the packet based multimedia communication standard to a driver level of the packet based multimedia communication standard.

7. The method of claim 1, wherein the method operation of transmitting the data packets further includes maintaining the TCP SEQ number constant if a difference between the TCP ACK number and a current TCP SEQ number has grown to a predefined value, whereby the firewall will not block the data packets as the data packets appear to be retransmissions of lost packets.

8. A method for communicating port traffic through a single Hypertext Transfer Protocol (HTTP) port, comprising:
   a) establishing a connection between a first and second computing device;
   b) transmitting allocation data associated with the port traffic to a tunneling driver;
   c) segmenting the port traffic into datagrams;
   d) appending a first header to each one of the datagrams; and
   e) appending a Transmission Control Protocol/Internet Protocol (TCP/IP) header over the first header,
   wherein the method operation of appending a TCP/IP header includes,
      inserting a flag into an upper byte of a window size field of the TCP/IP header,
      inserting a checksum into a lower byte of the window size field of the TCP/IP header,
   wherein the TCP/IP header includes a TCP SEQ number and a TCP ACK number that are incremented and tracked in order to simulate a stateful connection,
   and the TCP/IP header is configured to direct each one of the datagrams to the single HTTP port.

9. The method of claim 8, wherein the single HTTP port is port 80.

10. The method of claim 8, wherein the method operation of transmitting allocation data includes,
   defining a port number and a protocol type associated with the port traffic.

11. The method of claim 8, wherein the establishing of the connection between a first and second computing device is initiated with a SYN and a SYN+ACK handshake sequence according to TCP protocol.

12. The method of claim 8, wherein the method operation of appending a Transmission Control Protocol/Internet Protocol (TCP/IP) header over the first header further includes,
   inserting the TCP SEQ number; and
   inserting the TCP ACK number,
   wherein subsequent to an initial TCP SEQ number, the TCP SEQ number and the TCP ACK number are determined according to TCP protocol.

13. A tangible computer readable storage medium having program instructions for tunneling data associated with a packet based multimedia communication standard, comprising:
   program instructions for intercepting a library call associated with the multimedia communication standard;
   program instructions for registering identification data associated with the library call;
   program instructions for establishing a TCP tunneling connection related to the identification data;
   program instructions for adding a Transmission Control Protocol/Internet Protocol (TCP/IP) header over a pre-existing header of a all data packets related to the identification data, wherein the program instructions for adding a TCP/IP header includes,
      program instructions for inserting an identifying value flag into an upper byte of a window size field of the TCP/IP header;
      program instructions for inserting a checksum into a lower byte of the window size field of the TCP/IP header; and
   program instructions for transmitting the data packets having the TCP/IP header through a firewall,
   wherein the TCP/IP header is a simulated stateful TCP/IP header and includes a TCP SEQ number and a TCP ACK number.

14. The tangible computer readable storage medium of claim 13, wherein the program instructions for operation of registering identification data associated with the library call includes,
   program instructions for checking if a port number and a protocol type are defined in a table; and
   program instructions for adding the port number and the protocol type to the table.

15. The tangible computer readable storage medium of claim 14, wherein the port number is port 80 and the protocol type is TCP.

16. The tangible computer readable storage medium of claim 13, wherein the identification data includes a port number and a protocol type associated with the data packet.

17. The tangible computer readable storage medium of claim 13, wherein the program instructions for adding a TCP/IP header over a pre-existing header of a data packet related to the identification data further includes,
   program instructions for inserting a TCP SEQ number in the TCP/IP header; and
   program instructions for inserting a TCP ACK number in the TCP/IP header,
   wherein after an initial assignment of the TCP SEQ number, the TCP SEQ number and the TCP ACK number are determined according to TCP protocol.

18. The tangible computer readable storage medium of claim 13, wherein the program instructions for registering identification data associated with the library call are completed prior to advancing data associated with the library call from an application level of a protocol stack of the packet based multimedia communication standard to a driver level of the packet based multimedia communication standard.

19. A system for tunneling port traffic destined for multiple ports through a single port, comprising:
   a server configured to transmit data packets over a TCP connection, each data packet having a tunneling header in addition to a packet header;
   a firewall limiting a number of unblocked TCP ports, the firewall capable of analyzing the tunneling header, wherein the tunneling header is associated with the single port so that the firewall allows the data packets to pass through; and
   a client configured to receive the data packets from the firewall through the single port, the client further configured to identify a flag and a checksum associated with the tunneling header in order to strip the tunneling header for access to the packet header,
   wherein the tunneling header is stateful having a TCP SEQ number and a TCP ACK number,
   wherein the flag and the checksum are incorporated into a lower byte and a upper byte of a window size field of the tunneling header respectively.

20. The system of claim 19, wherein the packet header is a User Datagram Protocol (UDP) packet header.

21. The system of claim 19, wherein the single port is hypertext transfer protocol (HTTP) port 80.

22. A tangible computer readable storage medium having program instructions for communicating port traffic through a single Hypertext Transfer Protocol (HTTP) port, comprising:
   a) program instructions for establishing a connection between a first and second computing device;
   b) program instructions for transmitting allocation data associated with the port traffic to a tunneling driver;

c) program instructions for segmenting the port traffic into datagrams;

d) program instructions for appending a first header to each one of the datagrams; and e) program instructions for appending a Transmission Control Protocol/Internet Protocol (TCP/IP) header over the first header, wherein the program instructions for appending a TCP/IP header includes, program instructions for inserting a predefined identifying value into an upper byte of a window size field of the TCP/IP header;

program instructions for inserting a checksum into a lower byte of the window size field of the TCP/IP header, wherein the TCP/IP header is a simulated stateful TCP/IP header having a TCP SEQ number and a TCP ACK number and is configured to direct each one of the datagrams to the single HTTP port.

23. The tangible computer readable storage medium of claim 22, wherein the connection is a TCP connection and the single HTTP port is port 80.

24. The tangible computer readable storage medium of claim 22, wherein the program instructions for transmitting allocation data includes, program instructions for defining a port number and a protocol type associated with the port traffic.

25. The tangible computer readable storage medium of claim 22, wherein the first header is one of a TCP header and a User Datagram Protocol (UDP) header.

26. The tangible computer readable storage medium of claim 22, wherein the program instructions for appending a Transmission Control Protocol/Internet Protocol (TCP/IP) header over the first header further includes, program instructions for determining the TCP SEQ number and the TCP ACK number, an initial TCP SEQ number being randomly assigned and a subsequent TCP SEQ number and the TCP ACK number being determined according to TCP protocol.

* * * * *